United States Patent
Kuss

(10) Patent No.: US 11,504,919 B2
(45) Date of Patent: Nov. 22, 2022

(54) METHOD FOR MONITORING THE FUNCTION OF A TUBULAR BAG MACHINE

(71) Applicant: ROVEMA GMBH, Fernwald (DE)

(72) Inventor: Gerhard Kuss, Wetzlar (DE)

(73) Assignee: ROVEMA GMBH, Fernwald (DE)

( * ) Notice: Subject to any disclaimer, the term of this patent is extended or adjusted under 35 U.S.C. 154(b) by 302 days.

(21) Appl. No.: 16/614,227

(22) PCT Filed: May 16, 2018

(86) PCT No.: PCT/EP2018/062734
§ 371 (c)(1),
(2) Date: Nov. 15, 2019

(87) PCT Pub. No.: WO2018/215261
PCT Pub. Date: Nov. 29, 2018

(65) Prior Publication Data
US 2020/0171759 A1 Jun. 4, 2020

(30) Foreign Application Priority Data

May 23, 2017 (DE) ...................... 10 2017 208 768.4

(51) Int. Cl.
B29C 65/00 (2006.01)
B29L 31/00 (2006.01)
B65B 51/30 (2006.01)

(52) U.S. Cl.
CPC ...... B29C 66/1122 (2013.01); B29C 66/4312 (2013.01); B29C 66/9241 (2013.01);
(Continued)

(58) Field of Classification Search
CPC ..... B29C 65/02; B29C 65/18; B29C 66/1122; B29C 66/4312; B29C 66/83543;
(Continued)

(56) References Cited

U.S. PATENT DOCUMENTS 5,117,612 A * 6/1992 Keim ...................... B29C 65/18
53/451
5,439,539 A * 8/1995 McLean ................. B29C 66/96
156/64

(Continued)

FOREIGN PATENT DOCUMENTS

DE 69418297 T2 11/1999
DE 102007004140 A1 7/2008
(Continued)

OTHER PUBLICATIONS

Machine translation of DE 102013203295 date unknown.*

*Primary Examiner* — John L Goff, II
(74) *Attorney, Agent, or Firm* — Dickinson Wright PLLC; Andrew D. Dorisio

(57) ABSTRACT

A method for monitoring a tubular bag machine having a drive control system and independently controlled electronic drive units controlled by a drive control system for driving functional elements of the packing machine in a cycle time-synchronous manner in predefined motion sequences, one drive unit being a transverse sealing unit with a drive motor and two transverse sealing jaws for transversely sealing a film tube, and the drive motor torque measured using a drive controller, and the drive motor position measured using a position sensor, the method including moving the film tube into the sealing zone between the transverse sealing jaws, closing the jaws according to a predefined target torque stored in the drive control system, measuring the actual position of the drive motor upon reaching the target torque, and comparing the measured position to a target position stored in the drive control system associated with the predefined target torque.

3 Claims, 2 Drawing Sheets

(52) U.S. Cl.
CPC ...... *B29C 66/83543* (2013.01); *B29C 66/849* (2013.01); *B29L 2031/7128* (2013.01); *B65B 51/303* (2013.01)

(58) Field of Classification Search
CPC .............. B29C 66/849; B29C 66/8246; B29C 66/82265; B29C 66/87; B29C 66/8511; B29C 66/876; B29C 66/872; B29C 66/43121; B29C 66/43122; B29C 66/43123; B29C 66/43129; B29C 66/832; B29C 66/834; B29C 66/8491; B29C 66/851; B29C 66/90; B29C 66/91212; B29C 66/91213; B29C 66/9192; B29C 66/92; B29C 66/922; B29C 66/9221; B29C 66/92211; B29C 66/9231; B29C 66/92311; B29C 66/924; B29C 66/9241; B29C 66/92431; B29C 66/92441; B29C 66/92443; B29C 66/92445; B29C 66/92451; B29C 66/9261; B29C 66/92611; B29C 66/92613; B29C 66/92615; B29C 66/92651; B29C 66/92653; B29C 66/92655; B29C 66/929; B29C 66/9292; B29C 66/92921; B29C 66/95; B29C 66/9592; B29C 66/96; B29C 66/961; B29C 66/963; B29C 66/91231; B65B 51/303; B65B 2051/105; B65B 57/00; B65B 57/18; B65B 65/02; B29L 2031/7128; B32B 41/00; B32B 2041/04; B32B 2041/06
USPC ....... 156/64, 358, 359, 378; 53/75, 507, 451
See application file for complete search history.

(56) References Cited

U.S. PATENT DOCUMENTS

| | | | |
|---|---|---|---|
| 5,551,206 A * | 9/1996 | Fukuda | ............... B29C 65/18 53/75 |
| 5,653,085 A | 8/1997 | Suga | |
| 5,836,136 A * | 11/1998 | Highberger | ......... B29C 66/4312 53/75 |
| 2010/0108249 A1 | 5/2010 | Hunnicutt et al. | |

FOREIGN PATENT DOCUMENTS

| | | |
|---|---|---|
| DE | 102013203295 A1 | 8/2014 |
| EP | 0368016 A2 | 5/1990 |
| EP | 0865989 A2 | 9/1998 |
| JP | 2006193176 A | 7/2006 |
| WO | WO-9640558 A1 * 12/1996 | ......... G05B 19/4062 |

* cited by examiner

METHOD FOR MONITORING THE FUNCTION OF A TUBULAR BAG MACHINE

TECHNICAL FIELD OF THE INVENTION

The invention relates to a method for monitoring the function of a tubular bag machine.

BACKGROUND OF THE INVENTION

Tubular bag machines are generically equipped with a drive control system which can control multiple electronic drive units independently of each other. This allows the different functional elements of the packing machine, in particular the sealing units, to be driven in a cycle-synchronous manner as they are going through predefined motion sequences.

The method according to the invention is directed at monitoring the function of the transverse sealing unit of a tubular bag machine. The transverse sealing unit of generic tubular bag machines comprises at least one drive motor which can be used to drive two transverse sealing jaws which are drivable relative to each other. The drive motor may be realized in the manner of a servomotor, a geared servomotor or a torque motor, for example.

Using the transverse sealing jaws, the film tubes are sealed transversely to the conveying direction when producing the tubular bags. To this end, the transverse sealing jaws are closed, thus clamping the film web of the tubular bag between them and sealing it through introduction of process heat. Generically, a servomotor equipped with a position sensor system is provided for driving the transverse sealing jaws. The servomotor is operated with a drive controller.

The drive controller is to be characterized very generally in that it can be used to directly or indirectly measure the drive torque produced by the drive motor.

The position sensor system is to be characterized very generally in that it can be used to directly or indirectly measure the position of the drive motor.

For the actual sealing process in the sealing zone between the two transverse sealing jaws, the sealing force acting between the transverse sealing jaws is a highly relevant process parameter for the compliance with the desired sealing quality. However, the sealing force between the two sealing jaws can only be measured directly by means of complex sensor systems, which is why the drive torque of the drive motor is typically measured instead in known tubular bag machines. Since the drive torque is transmitted from the mechanical components of the transverse sealing unit to the transverse sealing jaws, the sealing force acting between the transverse sealing jaws can be derived from the respective drive torque of the drive motor and from the position of the drive using a transfer function which substantially represents the spring stiffness of the mechanical component of the transverse sealing unit. Oftentimes, the transfer functions to be used to characterize the mechanical properties of the transverse sealing unit translating the drive torque of the drive motor into the sealing force of the sealing jaws is determined experimentally.

Once the transfer function is set, the tubular bag machine is then operated using said transfer function; however, errors and deviations of the transfer function will no longer be detectable in that case.

For instance, in the event that the transverse sealing seam is contaminated or there are inclusions between the film layers or the bag has not been correctly folded during deformation, the film enters between the sealing tools into the transverse sealing jaws with dimensional deviations. These dimensional deviations and the thus changing geometry cause the transfer function used to translate the drive torque into the sealing force to change significantly. Different installation conditions may also lead to changes in the transfer function.

In the known tubular bag machines, these changes in the characteristics of the transfer function between the drive motor and the transverse sealing jaws cannot be detected, which is why an error analysis or error avoidance is oftentimes impossible in the event of disturbances of the packing process. Instead, production of the tubular bags continues despite the disturbance, without the actual error and the lacking quality of the transverse seam being detectable.

SUMMARY OF THE INVENTION

Hence, the object of the present invention is to propose a method for monitoring the function of a tubular bag machine by means of which changes and disturbances of the transfer function between the drive motor and the transverse sealing unit can be detected during the actual tubular bag production process.

Said object is attained by the teaching of the two independent main claims.

Advantageous embodiments of the invention are the subject-matter of the dependent claims.

First of all, the method according to the invention is based on the film tube being moved between the transverse sealing jaws at the beginning of the function monitoring. During production of the tubular bags, the film tube is located between the sealing jaws anyway, allowing the method for function monitoring according to the invention to be carried out parallel to the actual production process.

According to the first variation of the method according to the invention, the transverse sealing jaws are closed according to a preset target torque stored in the drive control system. Once the target torque has been reached, the actual position of the drive motor is then measured. Upon arrival at the target torque, said actual position of the drive motor is compared to a target position which is stored in the drive control system and which is associated with the predefined target torque. If the measured actual position measured upon arrival at the target torque deviates from the expected target position, it can be concluded that the transfer function between the drive motor and the transverse sealing unit has undergone an unexpected change, meaning that the desired quality cannot be produced using the transfer function present so far. In these cases, another error analysis has to be performed in order to return the production process to the desired quality level.

The manner in which the target position associated with the predefined target torque is determined is basically optional. It can be determined particularly simply by first calibrating the transverse sealing unit in order to determine the target position, thereby setting defined basic conditions. Subsequently, the transverse sealing jaws are closed and the desired target torque is established. Once the target torque has been reached, the actual position of the drive motor reached at that time is measured and the measured actual position is then stored in the drive control system as the target position associated with the target torque.

To increase the precision in determining the target position associated with the target torque, the corresponding process for reaching the target torque and of measuring the actual position reached in the process should be repeated multiple times, the actual positions measured in the process then being converted into a mean value and said mean value being stored in the drive control system as the target position.

Alternatively, the method according to the invention can also be performed by predefining a target position instead of a target torque for the closing of the transverse sealing jaws. Then, the actual torque produced by the drive motor upon arrival in the target position is measured, and, last, said measured actual torque is compared to a target torque which is stored in the drive control system and which is associated with the predefined target position.

In this variation of the method, too, the transverse sealing unit can first be calibrated and then an actual torque can be measured for the predefined target position in order to determine the target torque. Said actual torque achieved under the defined basic conditions is then stored in the drive control system as the target torque associated with the target position. The precision with which the target torque is determined can again be achieved by repeating the corresponding measurements of the actual torque and by forming a mean value.

The prevailing process temperature, in particular, has significant impact on the mechanical behavior of the translation of the of the drive torque of the drive motor into the sealing force of the sealing unit. This is because the mechanical strength of the components between the drive motor and the transverse sealing jaws either increases or lowers as a function of the respective temperature. Accordingly, this also changes the transfer function between the drive motor and the transverse sealing jaws. To eliminate this source of errors, it is particularly advantageous for the method according to the invention comprising method steps a), b), c) and d) to be carried out at a reference temperature which is stored in the drive control system.

The reference temperature should preferably correspond to the temperature at which the target positions and the target torques have been determined by measuring the actual positions and the actual torques of the calibrated transverse sealing unit, respectively.

In method step d) of the two methods according to the invention, the measured actual values are each compared to the expected target values for the position and the torque of the drive motor. To facilitate evaluation of the results of said comparison, the difference determined in method step d) between the target position and the actual position and between the target torque and the actual torque is particularly advantageously compared to a tolerance threshold stored in the drive control system. An error is reported only if the tolerance threshold is exceeded. This prevents very small deviations between the target value and the actual value from triggering error reports.

The manner in which the actual position of the drive motor is measured is basically optional. According to a preferred embodiment, first the actual position is measured directly using a rotation angle sensor. During sealing of the film, the sealing jaws cannot be closed completely. This means that a sealing path on which the film is compressed depends on the predefined sealing force.

Furthermore, the manner in which the actual torque of the drive motor is measured is basically optional, as well. A particularly simple way to do so is indirect measuring by means of the drive controller.

This is because servomotors according to the state of the art transmit predetermined torques with high precision.

To document the correct sealing parameters during production of tubular bags, it is particularly advantageous if the measured actual torque and the measured actual position are stored and documented once method steps a), b), c) and d) have been carried out.

The two methods according to the invention can be employed to monitor the function of both continuously operating tubular bag machines and intermittently operating tubular bag machines.

BRIEF DESCRIPTION OF THE DRAWING FIGURES

DETAILED DESCRIPTION OF THE INVENTION

Figure 1:
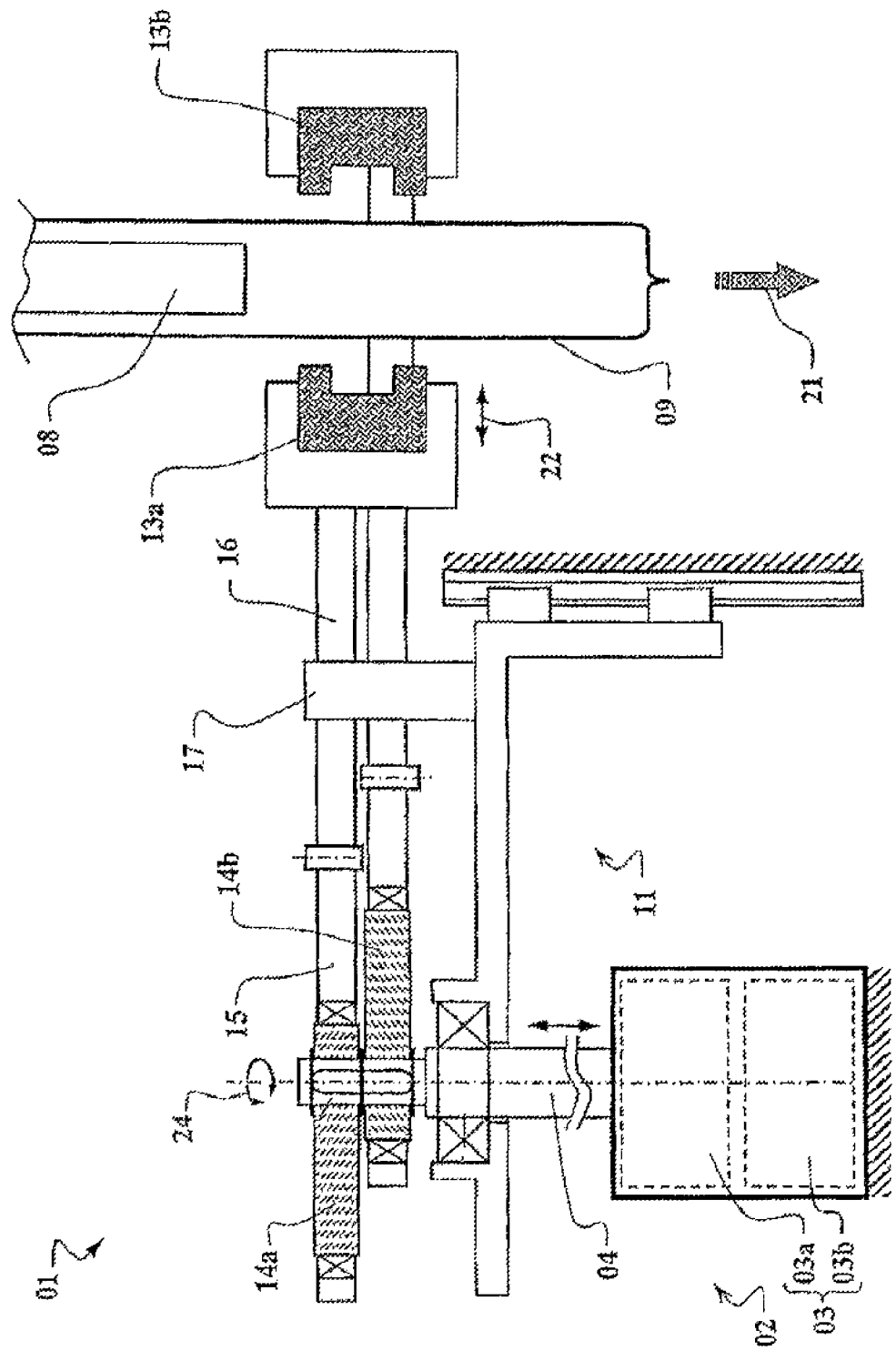
FIG. 1 shows a schematic side view of the transverse sealing unit of a known tubular bag machine.

FIG. 1 is a schematic of an example of the transverse sealing unit of a tubular bag machine comprising two transverse sealing jaws 13a and 13b which are moveable relative to each other.

An endlessly produced film tube 09 which can be filled with material to be packaged by means of a filling tube 08 is visible in FIG. 1. Film tube 09 is transported in conveying direction 21. To produce the individual tubular bags, film tube 09 is sealed transversely. Transverse sealing jaws 13a and 13b are used to do so. Said transverse sealing jaws 13a and 13b can be moved toward each other and away from each other in transverse direction 22 transversely to conveying direction 21. In the sealing position, transverse sealing jaws 13a and 13b are moved against each other so that film tube 09 located between them can be compressed and sealed by heating transverse sealing jaws 13a and 13b. The technique for the transverse sealing of tubular bags is known in principle and requires no further explanation.

In the exemplary embodiment illustrated in FIG. 1, transverse sealing jaws 13a and 13b are each disposed on support bars 16 which are mounted in a support bar mount 17 so as to be linearly displaceable in the transverse direction. Contrary movement of transverse sealing jaws 13a and 13b is realized by means of an eccentric mechanism. To this end, one eccentric element 14a and 14b per support bar 16 is mounted on drive shaft 04 so as to co-rotate therewith. In turn, a coupling element 15 which is connected to associated support bar 16 in a pivoting manner is mounted on each eccentric element 14a and 14b so as to rotate independently thereof. Thus, rotation 24 of drive shaft 04 and, simultaneously, of eccentric elements 14a and 14b can be translated into an alternating movement of respective support bars 16 and thus of transverse sealing jaws 13a and 13b.

Together with coupling element 15 and support bar 16, eccentric elements 14a and 14b disposed on drive shaft 04 form a translation mechanism which translates rotation 24 of drive shaft 04 into an alternating contrary movement of transverse sealing jaws 13a and 13b. The translation mechanism with transverse sealing jaws 13a and 13b is part of transverse sealing unit 11. A drive motor 02 realized in the manner of a servomotor and comprising a base 03a and a stator 03b is provided for driving drive shaft 04. Drive motor 02 is realized in the manner of a servomotor in which the actual position, namely rotation angle φ, and actual torque M can be measured using a drive controller, which is not shown in FIG. 1.

Figure 2:
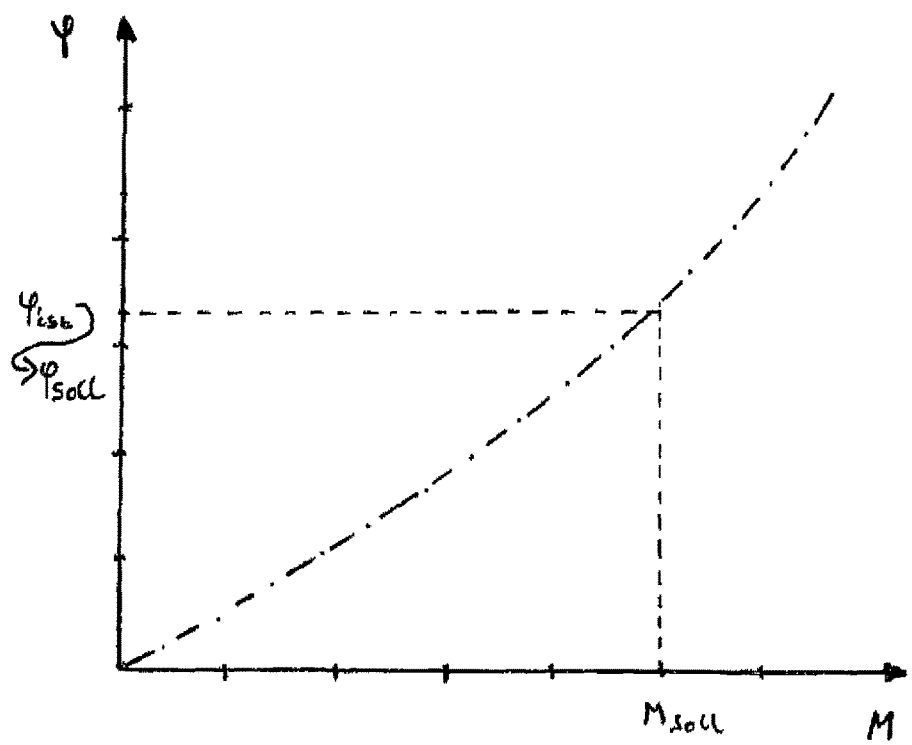
FIG. 2 shows a diagram relating to the determination of the target position associated with a target torque.

FIG. 2 shows a diagram relating to the recording of a target position, namely target rotation angle φ, which is associated with a target torque M. To record the corresponding value of target rotation angle φ, the entire tubular bag machine including transverse sealing unit 01 is first calibrated and film tube 09 used for the tubular bag production process is moved between transverse sealing jaws 13a and 13b. Then, the drive control system sets target torque $M_{Soll}$ for transverse sealing unit 01. Once torque value $M_{Soll}$ has been reached, actual rotation angle $\varphi_{1st}$ is determined by the position sensor system of the servomotor and the thus determined actual rotation angle $\varphi_{1st}$ is stored in the drive control system as target rotation angle $\varphi_{Soll}$. As illustrated in FIG. 2 in a schematic and exemplary manner, the value pair $M_{Soll}$ and $\varphi_{Soll}$ lies on a spring characteristic curve which represents the spring stiffness of the transverse sealing unit.

Figure 3:
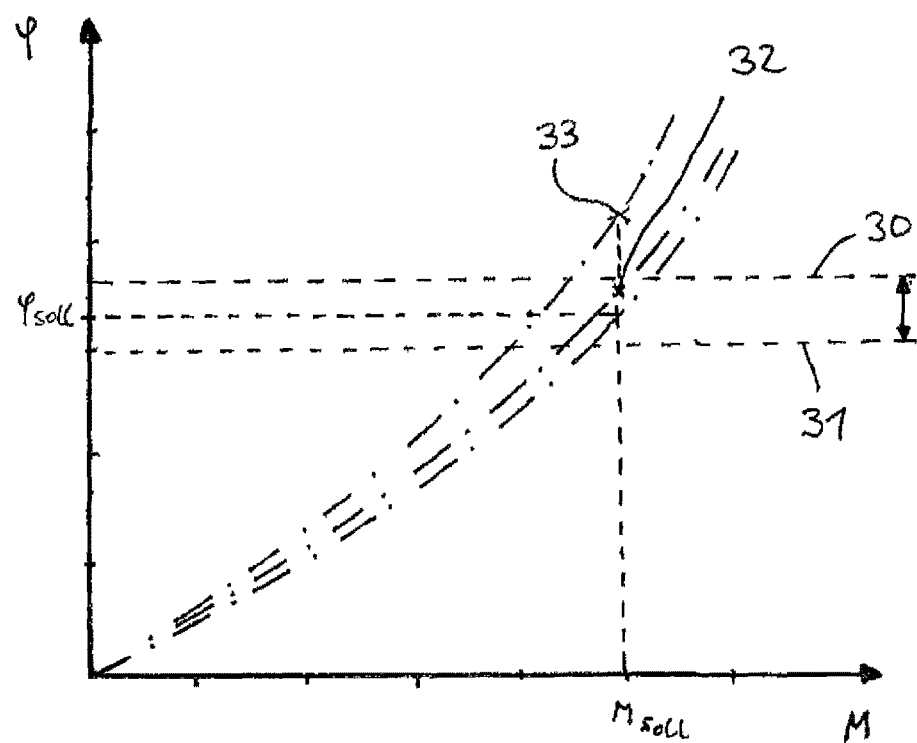
FIG. 3 shows a diagram relating to the monitoring of the function of the transverse sealing unit of FIG. 1, taking into account a tolerance threshold.

FIG. 3 shows the diagram according to FIG. 2 with the addition of two tolerance thresholds 30 and 31. Said two tolerance thresholds 30 and 31 form a corridor around the value of target rotation angle $\varphi_{Soll}$. During production of the tubular bags, the resulting value pairs of the reached target torque $M_{Soll}$ and the resulting actual position are permanently monitored parallel to the process. In FIG. 3, examples of two such value pairs 32 and 33 are displayed. In the case of value pair 32, the actual position after reaching the target torque $M_{Soll}$ is slightly above the value of target rotation angle $\varphi_{Soll}$ but still below tolerance threshold 30. Consequently, no error has been reported yet in this case because the deviation error is still relatively small.

In the case of value pair 33, the actual rotation angle upon reaching of target torque $M_{Soll}$ is already outside the tolerance corridor, which is why an error has been reported.

The invention claimed is:

1. A method for testing the function of a tubular bag machine, the tubular bag machine comprising a drive control system and multiple electronic drive units which are controlled independently of each other by the drive control system and which drive different functional elements of the tubular bag machine in a cycle time-synchronous manner as they are going through predefined motion sequences, and one drive unit being realized in the manner of a transverse sealing unit, and the transverse sealing unit comprising at least one drive motor (02) and two transverse sealing jaws (13a, 13b) which are driven relative to each other by the drive motor (02) and by means of which a film tube (09) is sealed transversely to a conveying direction (21), and a drive torque (M) of the drive motor (02) being measured directly or indirectly using a drive controller, and a position (φ) of the drive motor (02) being measured directly or indirectly using a position sensor, the method comprising the following steps:
    a) calibrating the transverse sealing unit by measuring a torque of the drive motor corresponding to a predefined target angular position of the drive motor stored in the drive control system, and storing said torque as a target torque in the drive control system;
    b) moving the film tube (09) into a sealing zone between the transverse sealing jaws (13a, 13b);
    c) closing the transverse sealing jaws (13a, 13b) according to the predefined target angular position stored in the drive control system;
    d) measuring an actual torque of the drive motor once the predefined target angular position has been reached;
    e) comparing the measured actual torque to the target torque stored in the drive control system and associated with the predefined target angular position.

2. The method according to claim 1, characterized in that step a) comprises measuring the torque of the drive motor corresponding to the predefined target angular position multiple times in a row, and further comprises calculating a mean torque value from said measuring step, the mean torque value being stored in the drive control system as the target torque associated with the predefined target angular position.

3. The method according to claim 1, characterized in that the actual torque is measured indirectly by the drive controller of the drive motor (02).

* * * * *